(12) United States Patent
Schuette

(10) Patent No.: US 8,683,161 B2
(45) Date of Patent: Mar. 25, 2014

(54) METHOD AND APPARATUS FOR INCREASING FILE COPY PERFORMANCE ON SOLID STATE MASS STORAGE DEVICES

(76) Inventor: Franz Michael Schuette, Colorado Springs, CO (US)

(*) Notice: Subject to any disclaimer, the term of this patent is extended or adjusted under 35 U.S.C. 154(b) by 223 days.

(21) Appl. No.: 12/835,817

(22) Filed: Jul. 14, 2010

(65) Prior Publication Data

US 2011/0173372 A1    Jul. 14, 2011

Related U.S. Application Data

(60) Provisional application No. 61/229,822, filed on Jul. 30, 2009.

(51) Int. Cl.
*G06F 12/08*   (2006.01)
*G06F 13/00*   (2006.01)
*G06F 13/28*   (2006.01)

(52) U.S. Cl.
USPC ............... 711/165; 711/103; 711/E12.008; 711/E12.084

(58) Field of Classification Search
None
See application file for complete search history.

(56) References Cited

U.S. PATENT DOCUMENTS

| | | | | |
|---|---|---|---|---|
| 5,864,657 A | * | 1/1999 | Stiffler | 714/15 |
| 2003/0140238 A1 | * | 7/2003 | Turkboylari | 713/193 |
| 2009/0276562 A1 | * | 11/2009 | Lieber | 711/103 |

* cited by examiner

*Primary Examiner* — Eric S Cardwell
(74) *Attorney, Agent, or Firm* — Hartman Global IP Law; Gary M. Hartman; Domenica N. S. Hartman

(57) ABSTRACT

A mass storage device and method that utilize storage memory and a shadow memory capable of increasing the speed associated with copying data from one location to another location within the storage memory without the need to access a host computer for the copy transaction. A controller of the mass storage device receives a file copy request for a file to be copied between first and second locations within the storage memory. Data from the first location within the storage memory is then loaded into a shadow memory means of the mass storage device, and then the data is written from the shadow memory means to the second location within the storage memory.

20 Claims, 3 Drawing Sheets

METHOD AND APPARATUS FOR INCREASING FILE COPY PERFORMANCE ON SOLID STATE MASS STORAGE DEVICES

CROSS REFERENCE TO RELATED APPLICATIONS

This application claims the benefit of U.S. Provisional Application No. 61/229,822, filed Jul. 30, 2009, the contents of which are incorporated herein by reference.

BACKGROUND OF THE INVENTION

The present invention generally relates to memory devices for use with computers and other processing apparatuses. More particularly, this invention relates to a non-volatile (permanent) memory-based mass storage device having a memory cache and a shadow memory to facilitate file copies internally on the device.

Mass storage devices such as advanced technology attachments (ATA), Serial ATA, small computer system interface (SCSI) drives, Serially attached SCSI (SAS) and advanced serial interfaces such as USB 2.0 or 3.0 or Gigabit-Ethernet-based solid state drives (SSDs) are rapidly adopting non-volatile memory technology such as flash memory or other emerging solid state memory technology including phase change memory (PCM), resistive random access memory (RRAM), magnetoresistive random access memory (MRAM), ferromagnetic random access memory (FRAM), organic memories, or nanotechnology-based storage media such as carbon nanofiber/nanotube-based substrates. The currently most common technology uses NAND flash memory as inexpensive storage memory. All these technologies have in common that they eliminate mechanical access latencies and, therefore, deliver performance that is substantially higher than that known for conventional electro-mechanical hard disk drives.

One of the functional consequences of the increased performance of non-volatile memory-based mass storage devices is that the host transfer rate becomes a limiting factor. In most scenarios, this transfer rate between the device itself and the host (computer) is sufficient to accommodate the internal transfer rate between the storage media and the on-device controller. However, there are special scenarios where the host interface becomes a bottleneck. A case in point is the situation where data are copied or moved from one location on the device to another location without any modification. In this case, the user-induced processing time of data as, for example, re-coding of audio-visual contents is no longer a contributing factor to the overall execution time of the task. Consequently, only the raw copy speed from one physical location to another limits the completion of the workload.

Regardless of whether the data are modified or whether an exact bit-to-bit copy of the data is performed, the data still have to be read out of the device into the host, temporarily stored in system memory, and then written back to the device. In Serial ATA devices, the host interface is dual-ported, meaning that it supports concurrent read and write transactions. On the other hand, there are still substantial delays associated with the overall round-trip of data from the drive controller to the host bus adapter and system interconnect to the memory controller, and finally to the DRAM and back.

Particularly for copies of data, irrespective of whether it is for another working copy or else to preserve version differences of the same document or any other purpose, it would be advantageous to have a shortcut on the device itself to perform exactly this type of data transfer without consuming valuable cycles on the various controllers on the system level that could lead to bus contention and without wasting memory bandwidth.

BRIEF DESCRIPTION OF THE INVENTION

The present invention provides a mass storage device and method that utilize storage memory and a shadow memory capable of increasing the speed associated with copying data from one location to another location within the storage memory without the need to access a host computer system for the copy transaction.

According to a first aspect of the invention, the mass storage device includes a package comprising a circuit board, a connector adapted to interface the circuit board with a host bus adapter of a host computer, a cache memory device on the circuit board, storage memory comprising at least one non-volatile storage memory device on the circuit board, shadow memory means on the circuit board, and a controller on the circuit board. In response to a file copy request received by the mass storage device for a file to be copied between first and second locations within the storage memory, the controller operates to load data from the first location within the storage memory into the shadow memory means and write the data from the shadow memory means to the second location within the storage memory.

According to a second aspect of the invention, the method involves copying a file between locations within storage memory of a mass storage device. A controller of the mass storage device receives a file copy request for a file to be copied between first and second locations within the storage memory. Data from the first location within the storage memory is then loaded into a shadow memory means of the mass storage device, and then the data is written from the shadow memory means to the second location within the storage memory.

In view of the above, it can be seen that a significant advantage of this invention is that a host computer is not required to be accessed during the data transaction, and particularly data transfers do not occur over the system bus and to the system memory of the computer, such that the overhead for the file copy sequence is dramatically reduced. Instead, all data transfers can be handled internally on the mass storage device, which conserves system bandwidth and reduces system bus contention.

Other aspects and advantages of this invention will be better appreciated from the following detailed description.

DETAILED DESCRIPTION OF THE INVENTION

Figure 1:
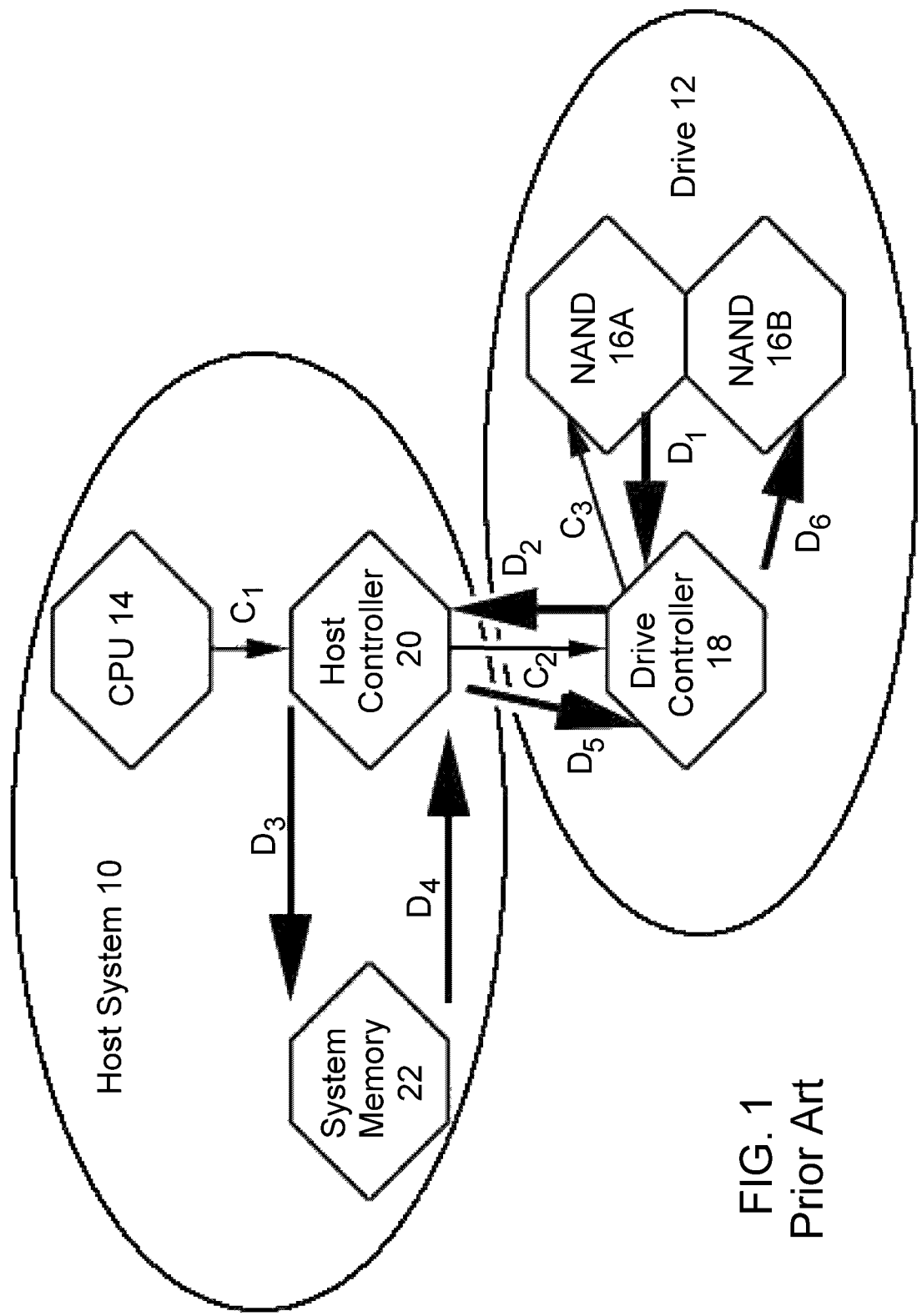
FIG. 1 is a flow diagram of a command and data sequence in a typical file-copy scenario performed between a host computer and a non-volatile memory-based mass storage device of the prior art.

FIG. 1 schematically represents different transactions involved when performing a simple file copy from one location on a mass storage device, in particular, a solid-state drive (SSD) 12, to another location on the same drive 12. The drive 12 itself cannot copy the data directly. Rather, if the central processing unit (CPU) 14 of a host computer 10 requests a file copy, the data must be retrieved from the original location on the drive 12, in the present example, a non-volatile memory device 16A on the drive 12, through a series of file copy commands $C_1$, $C_2$ and $C_3$. The data are then transferred (data transfer $D_1$) via the drive's interface (drive controller) 18 to the host bus adapter (host controller) 16 of the computer 10 (data transfer $D_2$), and then via a direct memory access (DMA) channel to the system memory 22 (data transfer $D_3$), from which the data are then written back through another DMA channel to the host controller 16 (data transfer $D_4$), through the drive controller 18 (data transfer $D_5$), and finally stored on a second location on the drive 12 (data transfer $D_6$), in the present example, another non-volatile memory device 16B on the drive 12. For reasons of simplicity, the additional snooping of the CPU's cache is omitted from FIG. 1.

Figure 2:
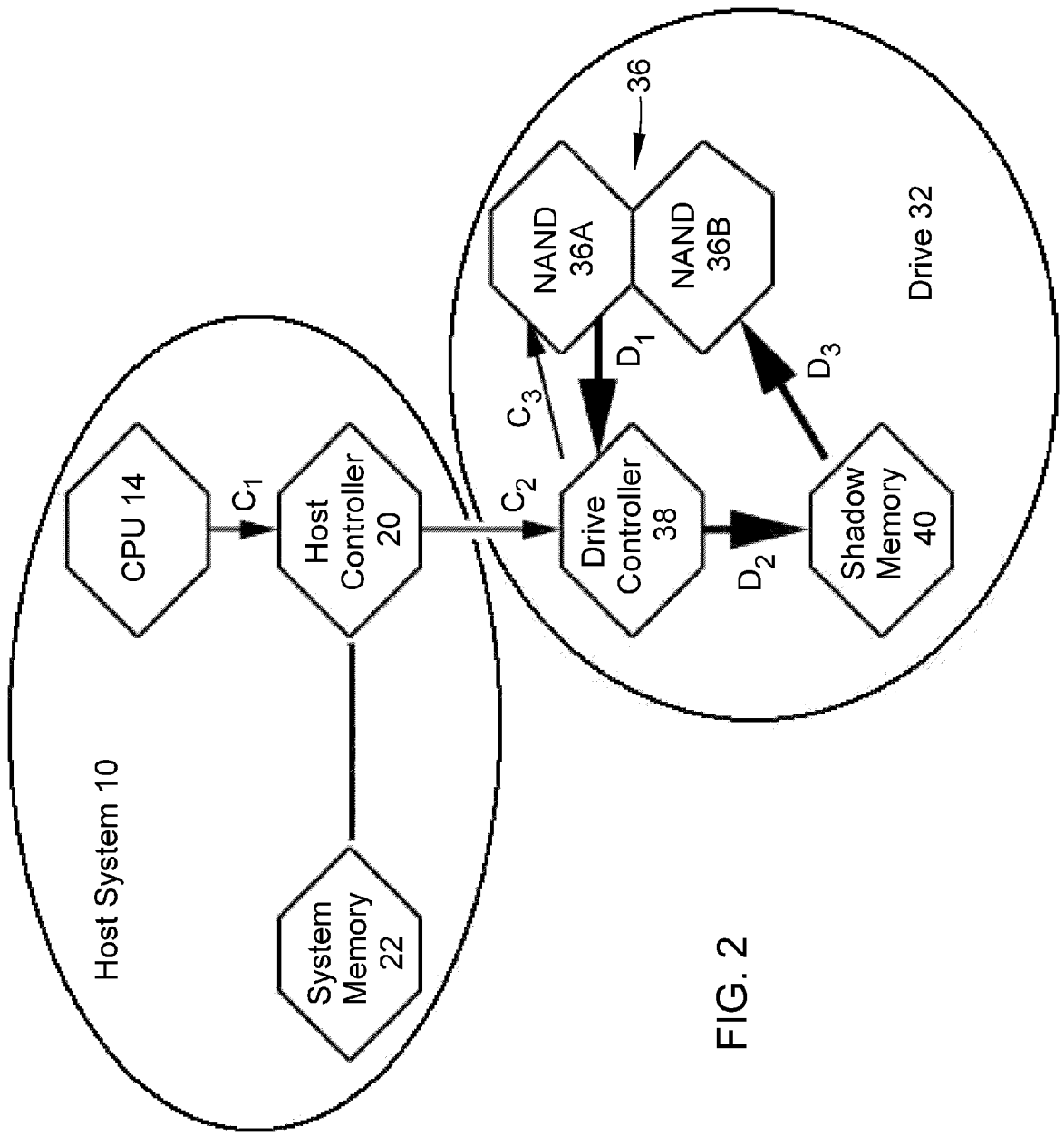
FIG. 2 is a schematic representing a reduced number of transactions that occur in a file-copy situation with a non-volatile memory-based mass storage device equipped with on-device shadow memory in accordance with an embodiment of the invention.

FIG. 2 schematically represents transactions corresponding to those represented in FIG. 1, but carried out in a far simpler manner as made possible with a mass storage device, in particular, a solid-state drive 32, configured in accordance with an embodiment of the present invention. For convenience, identical reference numerals are used in FIG. 2 to denote the same or functionally equivalent elements for the host computer 10 of FIG. 1. In FIG. 2, the host CPU 14 issues a file copy command ($C_1$) which is transferred to the drive 32 through the host bus adapter (host controller) 20, which issues a file copy command ($C_2$) to the drive controller 38 of the drive 32. In the situation where the file copy command issued by the CPU 14 is a simple file copy (in other words, the workload is an exact copy of existing data) from one location (represented as a non-volatile memory device 36A, a nonlimiting example being NAND flash memory) within non-volatile storage memory 36 on the drive 32, to another location (represented as a second non-volatile memory device 36B) within the non-volatile storage memory 36 on the drive 32, the drive controller 38 recognizes that the file is to be merely copied from the memory device 36A to the memory device 36B on the drive 32 without being altered, and issues a file copy command sequence ($C_3$) to copy the file into a shadow memory 40 on the drive 32 (data transfers $D_1$ and $D_2$) and then directly back to the memory device 36B (data transfer $D_3$), without routing the file through the host computer 10. Concurrently, the drive 32 updates its table of contents to reflect the new location of the file within the memory 36 on the drive 32 and acknowledges the execution and completion of the file copy to the host computer 10.

Since there is no access required of the computer 10 and its CPU 14, host controller 20 or system memory 22, which includes DMA transfers over the system bus and to the system memory 22 with a write followed by a read and cache snooping, the overhead for the file copy sequence is dramatically reduced. All transfers are handled internally on the drive 32, which further conserves system bandwidth and reduces system bus contention.

Figure 3:
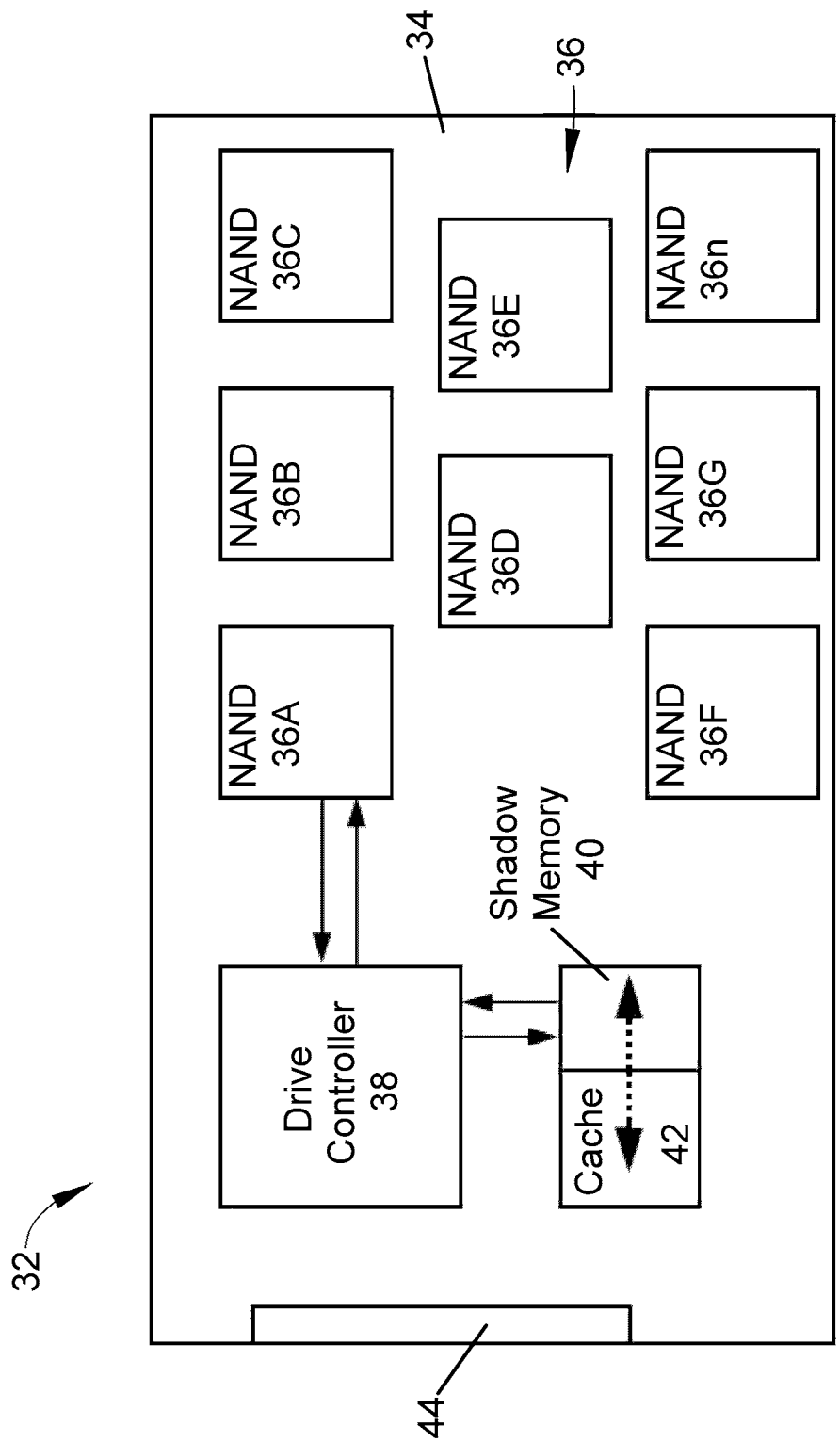
FIG. 3 schematically represents a solid state drive with dynamic partitioning of a volatile memory cache to allow allocation of on-device shadow memory on demand in accordance with an embodiment of the invention.

FIG. 3 schematically represents the solid-state drive 32 as comprising a circuit board 34 on which the various components of the drive 32 are mounted to form a package or enclosure, along with an interface in the form of a connector 44 for connecting the drive 32 to the host computer 10. The shadow memory 40 is random access memory (RAM) that can be in the form of a dedicated and separate volatile or non-volatile memory device (IC) mounted on the circuit board 34. Alternatively, and as represented in FIG. 3, the shadow memory 40 can be a partition of a memory cache 42 on the drive 32, such as a standard DRAM or SRAM-based volatile memory cache device of the type common to conventional HDDs and SSDs. The amount of shadow memory 40 allocated on the cache 42 can be predetermined by firmware of the drive 32. Alternatively, the amount of shadow memory 40 on the cache 42 can be dynamically allocated to a file-copy request, in which case if no file copy is in progress the partitioned shadow memory 40 can be relinquished and returned to the general purpose cache of the drive 32.

While certain components are shown and preferred for the mass storage device of this invention, it is foreseeable that functionally-equivalent components could be used or subsequently developed to perform the intended functions of the disclosed components. Therefore, while the invention has been described in terms of a preferred embodiment, it is apparent that other forms could be adopted by one skilled in the art, and the scope of the invention is to be limited only by the following claims.

The invention claimed is:

1. A mass storage device configured for copying data between locations within the mass storage device without accessing a host computer, the mass storage device comprising:
   a package comprising a circuit board;
   a connector adapted to interface the circuit board with a host bus adapter of a host computer;
   a memory cache device on the circuit board;
   storage memory comprising at least first and second non-volatile storage memory devices on the circuit board;
   shadow memory means on the circuit board, the shadow memory means being on a separate memory device that is separate from the storage memory; and
   a controller on the circuit board, the controller being operable to respond to a file copy request received by the mass storage device from the host computer for a file to be copied between first and second locations within the first and second non-volatile storage devices, respectively, of the storage memory without accessing the host computer, wherein the controller loads data from the first location within the storage memory into the shadow memory means and writes the data from the shadow memory means to the second location within the storage memory without routing the data through the host computer.

2. The mass storage device of claim 1, wherein the separate memory device of the shadow memory means is a dedicated memory device mounted on the circuit board.

3. The mass storage device of claim 2, wherein the separate memory device of the shadow memory means is a volatile memory device.

4. The mass storage device of claim 2, wherein the separate memory device of the shadow memory means is a non-volatile memory device.

5. The mass storage device of claim 2, wherein the separate memory device of the shadow memory means is a RAM memory device.

6. The mass storage device of claim 1, wherein the shadow memory means is a partitioned amount of shadow memory on the memory cache device.

7. The mass storage device of claim 6, wherein the partitioned amount of the shadow memory allocated on the memory cache device is predetermined by firmware of the mass storage device.

8. The mass storage device of claim 6, wherein the partitioned amount of the shadow memory on the memory cache device is dynamically allocated on demand.

9. The mass storage device of claim 8, wherein the partitioned amount of the shadow memory on the memory cache device is relinquished and returned to the memory cache device if no file copy is in progress.

10. The mass storage device of claim 1, wherein the memory cache device is a DRAM or SRAM-based volatile memory device.

11. The mass storage device of claim 1, wherein the mass storage device is connected to the host computer comprising a central processing unit, a host controller, and system memory, and the file copy request received by the mass storage device is issued by the central processing unit.

12. The mass storage device of claim 11, wherein the controller operates so that the central processing unit, the host controller, and the system memory of the host computer are not accessed in response to the file copy request received by the mass storage device for copying the file between two locations within the storage memory.

13. The mass storage device of claim 11, wherein all transfers between two locations within the storage memory occur internally on the mass storage device.

14. A method of copying a file between locations within storage memory of a mass storage device mass storage device without accessing a host computer, the method comprising:
a controller of the mass storage device receiving file copy requests from the host computer for files to be copied between first and second locations within the storage memory of the mass storage device without accessing the host computer, the controller being operable to respond to the file copy requests wherein the first and second locations are within one of first and second non-volatile storage devices of the storage memory and also operable to respond to the file copy requests wherein the first and second locations are within the first and second non-volatile storage devices, respectively, without accessing the host computer; and then
loading data from the first location within the storage memory into a shadow memory means on a separate memory device of the mass storage device that is separate from the storage memory, and then writing the data from the shadow memory means to the second location within the storage memory without routing the data through the host computer.

15. The method of claim 14, wherein the separate memory device of the shadow memory means is a dedicated memory device mounted within the mass storage device.

16. The method of claim 14, further comprising the step of providing the shadow memory means by partitioning an amount of shadow memory on a memory cache device of the mass storage device.

17. The method of claim 16, wherein the partitioned amount of the shadow memory allocated on the memory cache device is predetermined by firmware of the mass storage device.

18. The method of claim 16, wherein the partitioned amount of the shadow memory on the memory cache device is dynamically allocated on demand.

19. The method of claim 18, wherein the partitioned amount of the shadow memory on the memory cache device is relinquished and returned to the memory cache device if no file copy is in progress.

20. The method of claim 14, further comprising the step of connecting the mass storage device to the host computer comprising a central processing unit, a host controller, and system memory, and the file copy request received by the mass storage device is issued by the central processing unit, wherein the central processing unit, the host controller, and the system memory of the host computer are not accessed in response to the file copy request received by the mass storage device for copying the file between two locations within the storage memory.

* * * * *